(12) United States Patent
Valiyaparambil et al.

(10) Patent No.: US 7,613,750 B2
(45) Date of Patent: Nov. 3, 2009

(54) CREATING FREQUENT APPLICATION-CONSISTENT BACKUPS EFFICIENTLY

(75) Inventors: Manoj K. Valiyaparambil, Hyderabad (IN); Vivek Sahasranaman, Bangalore (IN); Vinay S. Badami, Hyderabad (IN); Abid Ali, Hyderabad (IN); Amit Singla, Hyderabad (IN); Karandeep Singh Anand, Kirkland, WA (US); Robert M. Fries, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 185 days.

(21) Appl. No.: 11/461,846

(22) Filed: Aug. 2, 2006

(65) Prior Publication Data

US 2007/0276885 A1 Nov. 29, 2007

(30) Foreign Application Priority Data

May 29, 2006 (IN) .................. 1283/DEL/2006

(51) Int. Cl.
G06F 17/30 (2006.01)
G06F 13/00 (2006.01)
(52) U.S. Cl. ..................... 707/204; 711/162
(58) Field of Classification Search .............. 707/10, 707/100, 200, 202–204; 711/161, 162
See application file for complete search history.

(56) References Cited

U.S. PATENT DOCUMENTS

| | | | | |
|---|---|---|---|---|
| 4,686,620 A | * | 8/1987 | Ng | 707/10 |
| 5,588,147 A | * | 12/1996 | Neeman et al. | 707/1 |
| 5,613,079 A | * | 3/1997 | Debique et al. | 711/141 |
| 5,907,672 A | * | 5/1999 | Matze et al. | 714/8 |
| 6,269,381 B1 | * | 7/2001 | St. Pierre et al. | 707/202 |
| 6,434,681 B1 | * | 8/2002 | Armangau | 711/162 |
| 6,604,118 B2 | | 8/2003 | Kleiman et al. | |

(Continued)

FOREIGN PATENT DOCUMENTS

KR 20020065976 8/2002

OTHER PUBLICATIONS

Cooperstein et al., "Keeping an Eye on Your NTFS Drives, Part II: Building a Change Journal Application" Oct. 1999, Microsoft, 27 pages.*

(Continued)

*Primary Examiner*—John R Cottingham
*Assistant Examiner*—James E Richardson
(74) *Attorney, Agent, or Firm*—Workman Nydegger (57) ABSTRACT

Data can be protected at a production server in a virtually continuous fashion, without necessarily imposing severe constraints on the source application(s). For example, a production server can create an application-consistent backup of one or more volumes, the backups corresponding to a first instance in time. A volume filter driver can monitor data changes in each volume using an in-memory bitmap, while a log file and/or update sequence number journal can keep track of which files have been added to or updated. The volume updates are also consistent for an instance (later) in time. At the next replication cycle, such as every few minutes (however configured), the volume filter driver passes each in-memory bitmap to the physical disk on the production server. The production server then sends the updates to the backup server, which thus stores application-consistent backups for the volume for multiple instances of time.

14 Claims, 3 Drawing Sheets

U.S. PATENT DOCUMENTS

| | | | |
|---|---|---|---|
| 6,880,052 | B2 | 4/2005 | Lubbers et al. |
| 6,947,981 | B2 | 9/2005 | Lubbers et al. |
| 7,032,126 | B2 | 4/2006 | Zalewski et al. |
| 7,039,663 | B1 | 5/2006 | Federwisch et al. |
| 2004/0139128 | A1* | 7/2004 | Becker et al. ............... 707/204 |
| 2004/0225659 | A1 | 11/2004 | O'Brien et al. |
| 2005/0010529 | A1 | 1/2005 | Zalewski et al. |
| 2005/0138306 | A1* | 6/2005 | Panchbudhe et al. ........ 711/162 |
| 2005/0177692 | A1* | 8/2005 | Boyd et al. ................ 711/162 |
| 2005/0262097 | A1 | 11/2005 | Sim-Tang et al. |
| 2005/0262377 | A1 | 11/2005 | Sim-Tang |
| 2006/0018505 | A1 | 1/2006 | Cherian et al. |
| 2006/0036901 | A1 | 2/2006 | Yang et al. |
| 2006/0064444 | A1 | 3/2006 | van Ingen et al. |
| 2006/0074993 | A1 | 4/2006 | Pulamarasetti et al. |
| 2006/0129761 | A1 | 6/2006 | Guha et al. |

OTHER PUBLICATIONS

Keeton, et al., "Automating data dependability", Date: 2002, pp. 93-100, http://delivery.acm.org/10.1145/1140000/1133391/p93-keeton.pdf?key1=1133391&key2=6082244511&coll=Portal&dl=GUIDE&CFID=74220359&CFTOKEN=92790055.

Patterson, et al., "SnapMirror: File System Based Asynchronous Mirroring for Disaster Recovery", Date: 2002, http://delivery.acm.org/10.1145/1090000/1083335/p-patterson.pdf?key1=1083335&key2=6052244511&coll=Portal&dl=GUIDE&CFID=74220359&CFTOKEN=92790055.

Yang et al., "TRAP-Array: A Disk Array Architecture Providing Timely Recovery to Any Point-in-time", Date: 2006, pp. 289-301, http://delivery.acm.org/10.1145/1140000/1136511/26080289.pdf?key1=1136511&key2=7242244511&coll=Portal&dl=GUIDE&CFID=74220359&CFTOKEN=92790055.

* cited by examiner

CREATING FREQUENT APPLICATION-CONSISTENT BACKUPS EFFICIENTLY

CROSS-REFERENCE TO RELATED APPLICATIONS

The present application claims the benefit of priority to Indian Patent Application Ser. No. 1283/DEL/2006, filed in the Indian Patent Office on May 29, 2006, and entitled "CREATING FREQUENT APPLICATION-CONSISTENT BACKUPS EFFICIENTLY," the entire contents of which are incorporated herein by reference. The aforementioned Indian patent filing was made pursuant to USPTO Foreign Filing License No. 536,419, granted on May 23, 2006.

BACKGROUND

Background and Relevant Art

As computerized systems have increased in popularity, so have the needs to store and backup electronic files and other communications created by the users and applications associated therewith. In general, computer systems and related devices create files for a variety of reasons, such as in the general case of creating a word processing document in a work setting, as well as creating a file used for more sophisticated database purposes. In addition, many of these documents can include valuable work product, or sensitive information that should be protected. One will appreciate, therefore, that there are a variety of reasons why an organization will want to backup electronic files on a regular basis, and thereby create a reliable restoration of an originally created file when needed.

Despite some of the conveniences afforded by many conventional backup systems, the mechanisms used by many conventional systems are often less efficient than optimal. For example, the ability to create an application-consistent backup can be an important component of some backup systems. An application-consistent (as well as a file system-consistent) backup is basically a backed-up set of data that are consistent in file state for a particular point in time. For example, if a backup administrator copied all data on a given production server volume, even as the data may be in the process of being written-to or updated, the file state of the corresponding backup copy may not necessarily be consistent for a single point in time. Creating an application-consistent backup, therefore, generally involves the additional effort of reconciling file state.

Nevertheless, one can appreciate that there can be any number of difficulties associated with creating application-consistent data backups. For example, conventional mechanisms for creating a backup generally involve an application program, such as a backup component of a mail or database application program, calling one or more backup and/or restoration Application Program Interfaces ("APIs"). In particular, the backup component might tell the APIs to freeze writes to certain specified disk data on the production server, and then create a backup copy (i.e., "replica") of the data. Unfortunately, there is generally no simple way for backup components to describe their data to the backup APIs at the production server. Further complicating this difficulty is the fact that there can sometimes be a large number of backup APIs that may need to be referenced during a backup process.

In addition, the fact that a particular application that created certain data is requesting the backup services often implies that less than all of the production server data might be backed up at any given time. For example, conventional backup mechanisms are often application-specific with respect to the data being backed-up. Such application-specific backup approaches often involve running multiple instances of the given application during the backup process. One will appreciate, however, that running multiple instances of a given application can be inefficient for a number of reasons, whether from a cost or resource expenditure perspective.

Furthermore, even using applications to provide backup services can be somewhat ineffective since application-specific backups generally do not provide point-in-time copies of the application data without significant resource expenditures. This can mean that an application may not be able to provide an application-consistent point-in-time backup with high frequency (thus providing highly granular recovery points) without overloading both the production server and the backup server. Thus, conventional backups performed by a particular application typically cannot provide a "hot standby" of point-in-time backups that are only a few minutes old.

This general lack of granular configurability can extend to a wide variety of other issues in backup systems. For example, conventional backup systems can be difficult to configure for types of files, specific folders, or folder locations on a particular volume. Thus, there can be difficulties associated with having conventional backup systems backup production server data with better granularity than just an entire one or more volumes, or just entire files, as opposed to backing up just those portions of the files that have actually been modified. These and other similar problems often mean that the production server and backup server are configured to copy and transfer more data between them than necessary, which of course can affect system performance and network bandwidth. In particular, the production server may be copying and transferring file data that have not changed, as well as entire files that have only changed only in small part. Because of this, the backup server may also need to devote more storage capacity than necessary for backing up the production server data.

One will appreciate, therefore, that each of the afore-mentioned factors (or combinations thereof) can negatively affect Recovery Point Objectives ("RPO"), which generally refer to how far back in time data need to be recovered in order for an organization to re-launch operations after a disaster. The afore-mentioned factors can also negatively affect Recovery Time Objectives (RTO), which generally refer to how much time will pass after a disaster before the data necessary for re-launching operations can be recovered. That is, conventional backup systems are generally ill-equipped to provide relatively high recovery points, particularly in a relatively quick amount of time without undue burdens on system resources.

Present backup systems, therefore, face a number of difficulties that can be addressed.

BRIEF SUMMARY

Implementations of the present invention solve one or more problems in the art with systems, methods, and computer program products configured at least in part to optimize recovery point objectives and recovery time objectives in backup systems. For example, in at least one implementation, resource savings at a production server can be achieved by monitoring changes to production server volumes with a volume filter driver. In addition, network bandwidth and backup server resources can be used efficiently by transferring primarily just the incremental changes (e.g., bytes, or byte ranges of changes) to a backup server since the last replication cycle. As will be appreciated more fully herein, such optimizations can provide the ability to backup production server data in a virtually continuous (or near continuous) fashion without significant drains on production server resources, backup server resources, and/or network bandwidth concerns.

For example, a method from the perspective of a production server of replicating production server data in a virtually continuous, consistent fashion can involve sending a copy of volume data from one or more volumes of a production server to a backup server. In such a case, the sent copy of data for the volume(s) will generally be consistent (i.e., application-consistent or file system-consistent) for a first instance of time. In addition, the method can involve identifying one or more changes to the volume data via one or more volume log files. The method can further involve, upon identifying a replication cycle event, saving the one or more data changes in the one or more volume log files. Generally, the one or more data changes will also be consistent for a second (i.e., subsequent) instance of time. Still further, the method can involve sending to the backup server a copy of the one or more changes. As such, the backup server will have a copy of data of the one or more volumes, where the data are valid for a first instance of time and a second instance of time.

By contrast, a method from the perspective of a backup server of replicating production server data in a virtually continuous, consistent fashion, can involve receiving one or more volume backups from a production server. In such a case, the one or more volume backups are consistent for an initial instance of time. The method can also involve receiving one or more application-consistent backup updates, at least one of which is a consistent update to at least one of the one or more volume backups for a subsequent instance of time. In addition, the method can involve receiving a recovery request for data that are valid in accordance with the subsequent instance of time.

Furthermore, the method can also involve identifying the requested data for the subsequent instance of time at one or more backup server volumes. In such a case, the requested data include at least a portion of the at least one application-consistent backup update. In addition, the method can involve sending the requested data that is valid for the subsequent instance of time to the production server.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of exemplary implementations of the invention will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

The present invention extends to systems, methods, and computer program products configured at least in part to optimize recovery point objectives and recovery time objectives in backup systems. For example, in at least one implementation, resource savings at a production server can be achieved by monitoring changes to production server volumes with a volume filter driver. In addition, network bandwidth and backup server resources can be used efficiently by transferring primarily just the incremental changes (e.g., bytes, or byte ranges of changes) to a backup server since the last replication cycle. As will be appreciated more fully herein, such optimizations can provide the ability to backup production server data in a virtually continuous (or near continuous) fashion without significant drains on production server resources, backup server resources, and/or network bandwidth concerns.

As will be appreciated more fully from the following specification and claims, implementations of the present invention can meet a wide range of "recovery time objectives" by refreshing the backup server with a "full snapshot" of production server data. In addition, implementations of the present invention include a volume filter driver that can be implemented at the production server. As will be appreciated more fully herein, the volume filter driver can be configured to monitor changes to bytes (and or byte blocks) on production server volume(s). The production server can then be configured to send an entire snapshot (or backup copy) by sending only those changed bytes (or byte blocks) to the backup server. As such, use of a volume filter driver can mitigate the burden on resources that might otherwise be consumed when moving a full snapshot of production server data to a backup server.

Furthermore, and as a result of these and other features, the production server can provide a backup server with virtually continuous backups of several "consistent" (i.e., application-consistent and/or file system-consistent) snapshots (i.e., initial backup and subsequent shadow copies) that are spaced close together in time. In addition, since each update to the backup is application-consistent (and/or file system-consistent), or valid for a specific instance of time, the difference between each update will also be application-consistent. As such, implementations of the present invention provide a user with the ability to recover a wide range of application-consistent data (e.g., from the file level, database level, and even entire production server level) with fairly high granularity (e.g., only a few minutes old) with much less burden than otherwise might be needed.

Figure 1A:
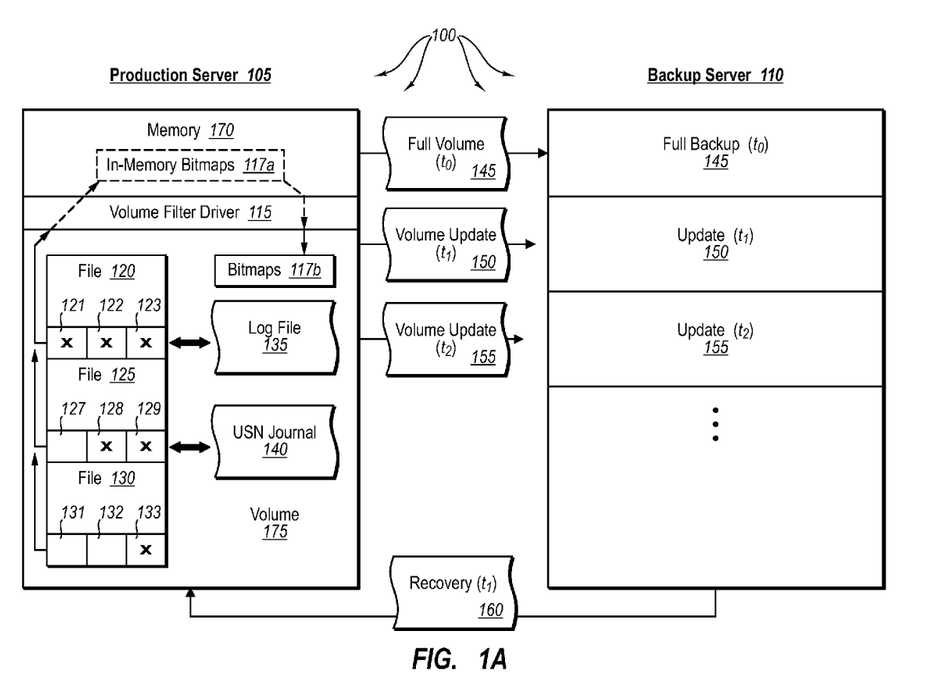
FIG. 1A illustrates an architectural overview diagram in accordance with an implementation of the present invention in which a production server creates incremental application (or file system)-consistent backups and sends those backups to a backup server.

Generally, there are a variety of ways in accordance with implementations of the present invention for implementing continuous, consistent backup services. In at least one very basic sense, creating a consistent backup includes creating a baseline copy (e.g., 145) of one or more volumes (e.g., 175), and then supplementing that baseline copy with incremental, consistent updates (e.g., 150, 155) to the one or more volumes. For example, FIG. 1A shows that production server 105 creates at least one baseline backup copy (e.g., 145) of data on selected volume(s) 175. In addition to simply creating the baseline copy 145, a backup administrator in system 100 might use any number or type of mechanisms to make copy 145 consistent.

In one implementation, the backup administrator might use a replica agent (not shown), installed at backup server 110 and/or at production server 105 to guide replication processes. During a replication cycle, for example the replica agent might be configured to instruct any one or more appropriate application writers on production server 105 to momentarily hold write activities on any one or more volumes (e.g., a database may span several volumes, and several applications can use the same volume with different replication schedules) for a single point in time. (For a file share backup, an application writer may not even be involved at all.) This allows the replica agent to thereby create a single point-in-time backup (i.e., "shadow copy") of the one or more volumes.

The replica agent may also provide instructions to each application writer to perform certain functions on their data of interest, to thereby ensure that all data and metadata are consistent for the point-in-time of the replication cycle. For more simple applications that may not have an application writer or corresponding plug-in associated therewith, the replica agent might be configured to simply instruct those applications to freeze or shut down during the replication cycle. The aforementioned agents, components, and functions for creating consistent backups can be provided in at least one implementation in the MICROSOFT environment, for example, with a Volume Shadow Copy Service ("VSS").

In any event, having frozen the writes of interest to a particular volume (or volumes) and for a particular instance in time, production server 105 can then make and send a copy of the volume(s) (or alternatively only those selected folders, files, or file types) of interest. For example, FIG. 1A shows production server 105 can provide this initial baseline copy 145 to backup server 110. Generally, production server 105 can provide the baseline copy 145 any number of ways. In one implementation, for example, production server 105 simply sends copy 145 over a network connection. In other implementations, such as where network bandwidth may be more limited, a backup administrator can transfer the volume copy to tape (or another intermediate storage node—not shown) and later connect that tape to backup server 110. However performed, production server 105 provides backup server 110 with at least one consistent baseline copy of all the data (i.e., valid for time "$t_0$,") for the volume, folder, file, or set of files of interest that shares the same replication cycle.

After providing one or more baseline copies of the one or more production server(s) volumes, backup server 110 can continue to receive updates to the baseline backup(s). For example, backup server 110 can continue to backup production server 105 on a wide variety of configurable replication schedules, such as those ranging in the order of about 5-10 minutes, 10-15 minutes, 15-30 minutes, or the like. Generally, the level to which the backup administrator configures the replication cycles will be the level of granularity to which one can access a particular "recovery points."

As previously discussed, ordinarily a relatively high level of granularity in the accessibility of point-in-time backups could be prohibitively resource-expensive for some backup systems. Thus, to create the above-mentioned level of granularity of "recovery points) without necessarily compromising the "time taken to recover" (e.g., without incurring significant overhead), implementations of the present invention can provide a number of important components and functions.

In one implementation discussed more fully hereinafter, for example, a volume filter driver 115 can be used to monitor iterative changes to any of the one or more volumes (e.g., 175) at production server 105, with either in-memory bitmaps, or by marking particular changed bytes (or byte blocks) in a volume log file on disk. Generally, a volume filter driver (e.g., 115) will be independent of how hardware or software-based "snapshots" are implemented on production server 105. One will appreciate, however, that a volume filter driver 115 is not necessarily required, and similar functions may be performed by other components, as also discussed herein. In additional or alternative implementations production server 105 can also monitor changes to the volume (e.g., changes to files 120, 125, 130, etc.) through the use of conventional shadow copy monitoring mechanisms, and/or Update Sequence Number journals (i.e., "USN journal" 140), or the like. With particular respect to the MICROSOFT operating environment, for example, such components are provided through combined use of a Volume Shadow Copy Service ("VSS") and a USN journal.

Generally, a volume log file (e.g., 135) can comprise all of the changes to a volume during a specific replication cycle (e.g., volume offset, length of data change) for each write to the volume, and/or in-memory bitmap of changes. When a specific replication cycle occurs, an existing volume log file (e.g., 135) is frozen, and a new volume log file (not shown) can be created to gather changes for the next replication cycle. In one implementation, volume level changes can be sent directly to backup server 110, without any additional correlating information. Corresponding updates sent to backup server 110 might then be applied into the replica as "byte n" (or "byte block n changed to n+1"). In additional or alternative implementations, volume data at production server 105 can also be correlated with USN journal (or related component) 140 information.

In particular, a USN journal (e.g., 140) comprises time-stamped information of such activities with respect to the file name data in the file system. Components similar or identical to USN journal 140 are also referred to as change filters, or change journals, or the like. Specific reference to a "USN journal 140" herein, therefore, is made primarily by way of convenience. In any event, and with reference to file system activity, production server 105 can combine volume log file (e.g., 135) data and change journal data (e.g., USN journal 140) to correlate the time, type of activity, and file name, etc. of the various writes to volume 175.

Along these lines, USN journal 140 can also be used in conjunction with volume log file 135 to correlate such things as the address of a particular byte or "byte block" change (as well as corresponding files for the change). In particular, each file on a volume can be thought of as an open set of addressable bytes, as well as an open set of addressable fixed-length byte blocks. In some cases, monitoring and transferring byte blocks (rather than individual bytes) can be a more efficient way to monitor and transfer changes, as well as determine how much space may be needed for backup purposes. In particular, this is in part since byte blocks represent a level of granularity that is usually somewhat less than that of an entire file, but greater than that of a single byte. As such, FIG. 1A shows that production server 105 logs the various byte or byte block changes to its files to be protected.

For example, FIG. 1A shows that production server 105 logs that bytes (or "byte blocks") 121, 122, and 123 of file 120 have changed (e.g., 120 is a new file) since the last replication cycle (e.g., last 5, 10, 15, 20, 25, or 30 minutes, etc.). Similarly, although file 125 comprises bytes (or byte blocks) 127, 128, and 129, only bytes 128 and 129 have changed; and where file 130 comprises bytes 131, 132, and 133, only byte 133 has changed since the last replication cycle. Generally, production server 105 can log these changed bytes in a read-only shadow copy of the volume, folder, or relevant files. As previously mentioned, production server 105 can also store these changed bytes for a volume log file as in-memory bitmaps (e.g., using a bit per block of data on the volume) that are later passed to physical disk during replication. However logged or monitored, and at an appropriate time (i.e., the next replication cycle), production server 105 can then prepare only these file changes (i.e., 121, 122, 123, 128, 129, 133, etc.) to be sent to backup server 110.

In this particular example, the changes (i.e., 121, 122, 123, 128, 129, 133, etc.) are each valid for the most recent point-in-time (i.e., "$t_1$"), and thus consistent (i.e., application-consistent or file system-consistent). Notably, since these bytes (or byte blocks) represent the difference between two consistent point-in-time backups, the application of these bytes (or byte blocks) at backup server 110 can also be consistent. After identifying these data changes, production server 105 can send these changes as updates 150 (for time $t_1$) to backup server 110. Similarly, production server 105 can identify and send each next set of incremental data changes (i.e., data changes logged for one or more volumes) in a next incremental update for the next replication cycle. For example, FIG. 1A also shows that production server 105 prepares and sends update 155 (for time $t_2$) to backup server 110, and so on.

One will appreciate that from the point at which production server 105 reads the changed data and prepares message 150, there may be additional changes to the volume data, which could make the data being read otherwise inconsistent (i.e., consistent for time "$t_1$" and valid for a subsequent time). As previously discussed with respect to baseline copy 145, therefore, a volume shadow copy service (or other VSS-like mechanism) can be used in at least one implementation to read data only for the frozen, particular instance in time, and not any changes subsequent thereto. This can help ensure that snapshot updates 150 (as well as 155, etc.) are consistent up to the indicated instance of time at which snapshot (also referred to as backup update or update) operations commenced.

Upon receipt, backup server 110 can store each backup and corresponding update(s) in a particular replica volume. In one implementation, backup server 110 stores the backups and updates in the same volume allocation of the same storage medium. In other implementations, backup server 110 (and/or additional backup servers or storage nodes) can store the backups and corresponding updates on separate volumes, and even on separate storage media, however desired by the backup administrator.

In some cases, and due to the nature of the virtually continuous, iterative backups of production server 105, a backup administrator may need to synchronize a number of aspects of the data with production server 105 data. For example, there may be cases of failure during a replication cycle, and/or over several replication cycles, such as may be due to network outage, log overflows (e.g., USN journal wrap, etc.). In one implementation, therefore, a backup administrator can perform a validation or correction by creating a new baseline full snapshot (e.g., similar to 145) of production server 105. The backup administrator can then perform (e.g., via production server 105) a checksum comparison (or other validation) between the a snapshot of the data on production server 105, and the data on backup server 110. Any errant data on backup server 110 can then be fixed, if necessary.

With particular respect to WINDOWS operating components, for example, this checksum can be performed in at least one implementation using Remote Differential Compression ("RDC") used in WINDOWS SERVER 2003. In some cases, use of an RDC type of mechanism may be preferable in a Wide Area Network ("WAN") environment. In another implementation, such as may be preferable in a Local Area Network ("LAN"), the backup administrator can divide each file in a snapshot into sets of "chunks" (e.g., byte blocks) and then compute checksums for each chunk.

In any event, due in part to the level of replication granularity provided by implementations of the present invention, if a user requests a particular version of a file (or other data representation) that is only a few minutes old (e.g., needed from a recent personal computer crash), the user can send a request to backup server 110 for that particular version of a file. For example, a user might request a particular copy of file 120 that was valid as of 5 minutes ago (e.g., "$t_0$," or before updates 121, 122, 123). Similarly, an administrator might request (not shown) an entire reproduction of volume or volumes 175.

Upon receipt of the request, and depending on the nature of the request, backup server 110 can then find the requested data as appropriate. For example, with respect to basic file-system data, each update of volume 175 could contain a full copy of requested data. Thus, backup server 110 might only need to identify the time requested by the user, identify the data within the corresponding update for that time, and then provide a copy of that data back to the user (e.g., recovery message 160).

In other cases, such as with mail or other types of database application data, each incremental update (e.g., 150, 155) received by backup server 110 might only contain an incremental update for the requested data. Thus, backup server 110 could be configured to play back each incremental update from the requested recovery point back to the last baseline full. Backup server 110 can then combine the requested data identified during playback (e.g., 145, 150, 155, or $t_{0-n}$), until reaching the time specified in the request. When all relevant data from the original backup and corresponding updates are combined and prepared, backup server 110 can then send the recovery response (e.g., 160), which is valid pursuant to the requested time. For example, FIG. 1A shows that backup server 110 sends response 160, which indicates that the recovered data are valid for time "$t_1$."

In the foregoing implementation, the backup server 110 may therefore need application support to playback the incremental updates. In another implementation, the baseline full copy and any corresponding incremental updates between the baseline full and the requested point in time can simply be copied back to production server 105. A corresponding application writer (e.g., an application writer within a shadow copy service framework) at production server 105 can then playback the logs on the full backup.

Generally, the time that elapses between the request for particular data and the corresponding response can be a function of at least two parts:

1. Time to transfer the data from backup server 110 to production server 105; and
2. Time for backup server 110 (e.g., via a relevant backup agent) to complete the recovery.

Of course, the time to transfer data from target to source is generally a function of the network bandwidth available, as well as disk speeds and resource usage at backup server 110 and production server 105. By contrast, the time to create a particular recovery is typically a function of the time required to recover a full copy of the production server data from a given baseline, and the time required to identify and play back accumulated updates (e.g., "$t_{n-1}$") accumulated from the baseline in order to recover a specific point in time. One will appreciate, therefore, that recovery time can be greatly enhanced by limiting the amount of updates backup server 110 (or production server 105) has to play back for any given recovery request, such as by creating periodic baseline full copies (e.g., 145).

As previously mentioned, one way of limiting the amount of incremental updates that backup server 110 might need to replay can involve creating a new "full" baseline snapshot periodically. Since creating and sending a new, full snapshot to backup server 110 can be resource-expensive (e.g., network bandwidth, production server 105 resources, and the amount of backup server 110 disk space needed) in some cases, implementations of the present invention also provide for the creation of "intelligent full snapshots." These intelligent, full snapshots are effectively a baseline demarcation of a predetermined point in time. For example, every predetermined period, such as every two weeks, backup server 110 can roll two weeks worth of incremental updates (e.g., 150, 155, etc.) together with the last baseline copy of data (e.g., 145, or newer), and thus create essentially a new "$t_0$" copy of production server 105 data.

In order to roll each of these incremental updates together efficiently, backup server 110 can be configured to monitor all writes to production server 105 volume since the last full snapshot. In at least one implementation, for example, backup server 110 implements volume filter driver 115 at production server 105 to monitor changes to the volume (i.e., one or more volumes), and store those writes in production server 105 memory 170 during each replication cycle. For example, FIG. 1A (see also FIG. 1B) shows that volume filter driver 115 interfaces between volume 175 and memory 170 on production server 105. As will be understood more fully in FIG. 1B, each time a change is made to volume data, volume filter driver 115 can record that change (or set of changes) in a volume log file 135. In at least one implementation, these changes are recorded in system memory 170 as an in-memory bitmap (e.g., 117*a*) for each of the one or more volumes. When production server 105 is ready for a particular replication cycle, volume filter driver 115 can then pass all the in-memory bitmaps to volume 175, and production server 105 can then send the corresponding data to backup server 110.

Figure 1B:
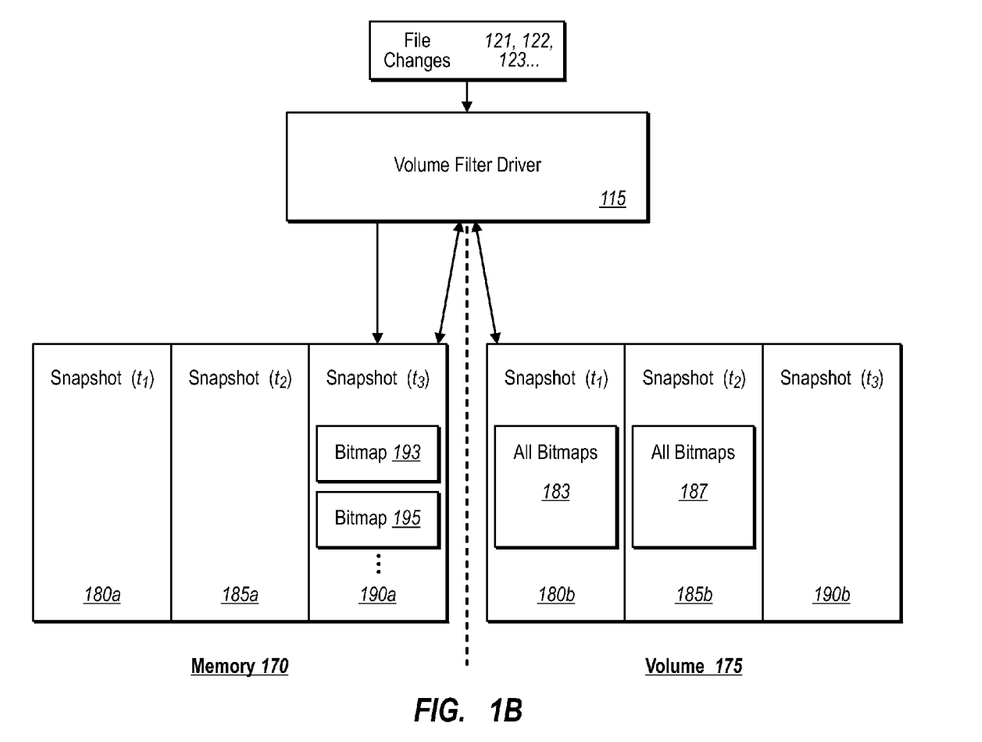
FIG. 1B illustrates an overview diagram in accordance with an implementation of the present invention in which a volume filter driver monitors changes to a volume using system memory and one or more physical disks.

For example, FIG. 1B shows that memory 170 has been used to gather snapshot data corresponding to various in-memory bitmaps. In particular, FIG. 1B shows that volume filter driver 115 identifies certain file changes (i.e., file changes 121, 122, 123, etc.), and subsequently stores these changes as corresponding in-memory bitmaps 193, 195, etc. in memory allocation 190*a*. In this particular example, volume filter driver 115 stores all changes to the corresponding one or more volumes since the last replication cycle (i.e., snapshot 185*a*—"$t_2$"), and, as such, each bitmap 193, 195, etc. is valid for the most recent instance of time in the corresponding snapshot (i.e., 190*a*, snapshot "$t_3$").

When the replication cycle is triggered, such as due to instructions received from a replica agent, volume filter driver 115 transfers all bitmaps for snapshot 190*a* (i.e., bitmaps 193, 195, etc.) to the appropriate volume 175 allocation 190*b*. For example, FIG. 1B shows that memory snapshot portions 180*a* and 185*a* have been emptied since the replication cycle for which they were generated has already passed. Furthermore, the corresponding volume 175 allocations 180*b*, 185*b*, etc. now contain "all bitmaps" 183, 187 that were previously stored in memory portions 180*a*, 185*a*, respectively. Ultimately, when a snapshot corresponding to the set of bitmaps is deleted, the bitmaps (e.g., 183, 187) can remain on the volume (e.g., 175).

These in-memory bitmaps (e.g., 193, 195) can be created and implemented a number of different ways. In one implementation, for example, backup server 110 takes a shadow copy snapshot (e.g., snapshot 150) of the production server 105 volume, an Input/Output Control ("IOCTL") can be sent to the shadow copy provider (software or hardware). This IOCTL can be intercepted by volume filter driver 115 to split the active bitmap. In response, and during creation of the shadow copy, volume filter driver 115 synchronizes the split by creating a frozen set of bitmaps (e.g., 180*a*/189*b*, 185*a*/185*b*) and a new active set of bitmaps (e.g., 190*a*/190*b*). In another alternative implementation, an entity that is capable of harvesting the shadow copy diff area (e.g., VSS diff area) could be aware of the volume level changes and also aware of the USN/file system. As such, this entity could provide an abstraction that would give the set of changed files and the set of changes in the files. An appropriate replication or backup application can then use this infrastructure for achieving replication.

When a replication cycle is triggered, volume filter driver 115 passes the frozen bitmaps to disk in order to reduce memory 170 usage. Volume filter driver 115 can also expose one or more IOCTLs that can be queried for all the changes that occurred since the most recent snapshot (e.g., "$t_{n-1}$"). In one implementation, querying these IOCTLs returns all the bitmaps that have been accumulated since the most recent snapshot. One will appreciate that using in-memory bitmaps as described herein to monitor changes can be very efficient, at least in part since in-memory bitmaps tend not to affect production server 105 resources significantly.

In an alternative implementation, and to identify each of these monitored changes, backup server 110 can also identify the set of files that are changed using, for example USN journal 140 (or using other monitored file metadata). Backup server 110 (or relevant component) can then query the production server 105 file system for the file extents that each changed file occupies. An intersection between the file extents queried from the file system and the file extents that volume filter driver 115 reports can provide the extents of the file that have changed since the last replication cycle, and thus allow certain files (e.g., database files) to be excluded from certain replication processes. Backup server 110 (or relevant component) can then repeat this process for each changed file (either as reported by a USN journal or by a similarly-configured metadata document).

With particular respect to using a USN journal to monitor changes at production server 105, one will appreciate that a File Reference Number ("FRN") at production server 105 might not match with the FRN for the same file stored at backup server 110. Thus, in order to send the monitored changes from production server 105 to backup server 110, it may be important in some cases to compute a correct, matching path to the particular changed file. For example, a volume might have the following changes, which involve modifying a path at production server 105 for file "y.txt":

1) Modify C:\a\b\c\y.txt
2) Rename C:\a\b to C:\p\q\r
3) Modify C:\p\q\r\b\c\y.txt
4) Delete C:\a In the example illustrated immediately above, original path "a\b" at production server 105 is renamed as path "p\q\r," and directory "\a" of the original path is deleted. This leaves the path at production server 105 for file "y.txt" to be "C:\p\q\p\r\b\c\y.txt." Nevertheless, these path changes for "y.txt" at production server 105 may not automatically result in changes to the path at backup server 110. In particular, the path to y.txt at backup server 110 will generally remain "\a\b\c\y.txt."

At the time of a snapshot, production server 105 might also record into the USN Journal the following changes shown below for example records 1-5:

1) {rsn=modify, FRN=yFRN, parentFRN=cFRN, filename=y.txt}
2) {rsn=rename-old, FRN=bFRN, parentFRN=aFRN, filename=b}
3) {rsn=rename-new, FRN=bFRN, parentFRN=rFRN, filename=b}
4) {rsn=modify, FRN=yFRN, parentFRN=cFRN, filename=y.txt}
5) {rsn=delete, FRN=aFRN, parentFRN=root, filename=a}

In addition from the foregoing example, the state of the relevant production server 105 volume at the time of replication is shown as "C:\p\q\r\b\c\y.txt."

In order to send changes for record 1 to backup server 110 in this particular example, production server 105 needs to retrieve the file path for "y.txt" from backup server 110. Specifically, due to the above-described path change, the path for "y.txt" at production server 105 in the snapshot for "c-FRN" is C:\p\q\r\b\c\y.txt, which is different from its path at backup server 110 (i.e., C:\a\b\c\y.txt). Implementations of the present invention can solve this issue with at least two alternative approaches. In one implementation, for example, the USN journal can simply retrieve and store path metadata from backup server 110 in a relational database, and thus continually correlate file paths at production server 105 and backup server 110.

In an alternative implementation, production server 105 can scan the USN journal twice. In the first pass, production server 105 can correlate this information through iterative scans (or "passes") of USN journal 140. In one scan, for example, production server 105 caches each folder rename. In a second pass, production server 105 can compute the corresponding path at backup server 110 based on the cached renames and current paths. For example, at the end of a first pass, production server 105 might cache the following information about deleted and/or renamed directories:

{FRN=bFRN, replica_parent=aFRN, replica_name=b}
{FRN=aFRN, replica_parent=root, replica_name=a}

To compute the file path for y.txt, production server 105 first identifies that the parent FRN (i.e., "File Reference Number") for y.txt in record "1" is cFRN. In a next step, production server 105 computes the file name for cFRN, as well as the file name of the parent FRN. Production server 105 then looks in cache before querying the file system. Since, in this example, the cache has no file name entry for the parent cFRN, production server 105 queries the file system, and determines that the file name is c, and that the parent is bFRN.

Production server 105 then computes the file name of bFRN, as well as bFRN's corresponding parent file name. As before, production server 105 first looks before querying the file system. Since the cache has an entry for bFRN in this example, production server 105 determines that the file name is b, and that the parent is aFRN. Production server then computes the file name of aFRN and the parent file name of aFRN. Again, production server 105 first looks at the cache before querying the file system, and since the cache has an entry for aFRN in this example, production server 105 determines that the file name of aFRN is "a," and the parent FRN is "root."

Ultimately, production server 105 computes the final path as "c:\a\b\c\y.txt." Next, when record 3 (rename-new) is processed in the second pass, the cache is updated for the new parent file name as follows.

{FRN=bFRN, replica_parent=rFRN, replica_name=b}
{FRN=aFRN, replica_parent=root, replica_name=a}

When production server 105 processes record 4, even though the record is identical to record 1, the path computed for y.txt is now "C:\p\q\r\b\c\y.txt." The computed path is different in this particular case since the parent "bFRN" in the cache is now "rFRN." Accordingly, the foregoing text illustrates how the two-pass algorithm can help optimize the amount of data that production server 105 transfers to backup server 110. In particular, the foregoing text describes multiple ways in which production server 105 can identify at the time of the second pass any created files, as well as any files that are modified and then deleted, and thus properly correlate file paths with backup server 110.

Figure 2:
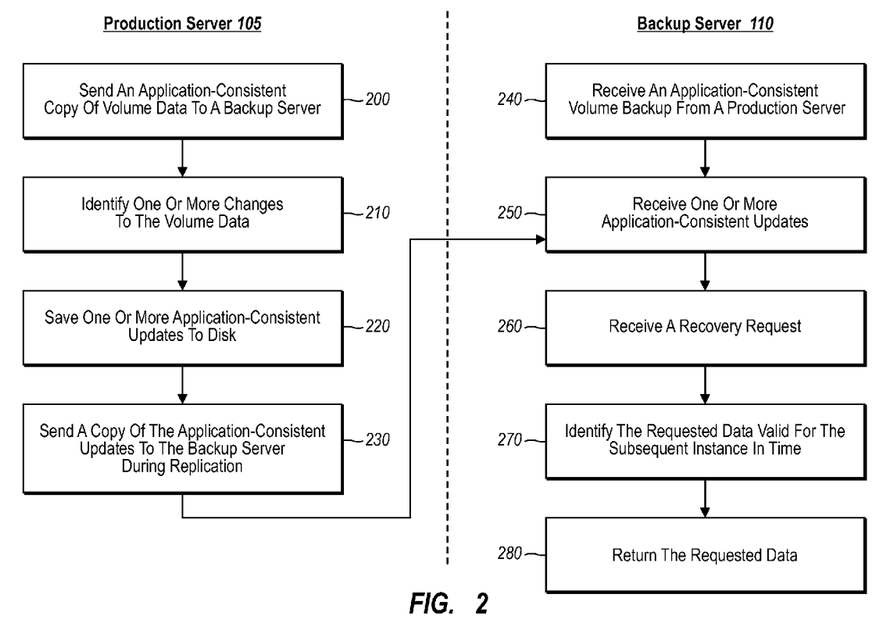
FIG. 2 illustrates flowcharts of methods comprising a sequence of acts performed from the perspective of a production server and a backup server in accordance with implementations of the present invention.

Accordingly, FIGS. 1A-1B and the corresponding text provide a number of systems, components, and mechanisms for efficiently backing up a production server's data in a virtually continuous fashion. In addition to the foregoing, implementations of the present invention can also be described in terms of flowcharts of methods having a sequence of acts for accomplishing a particular results. In particular, FIG. 2 illustrates flowcharts of from the perspective of production server 105 and backup server 110 in accordance with implementations of the present invention for backing up and recovering data. The acts illustrated in FIG. 2 are described below with respect to the components and diagrams illustrated in FIGS. 1A-1B.

As a preliminary matter, reference is sometimes made herein to a "first," "second," or "third" event (or an "instance") in a sequence of time. One will appreciate, however, that such designations are merely to differentiate unique instances on a continuum, such that the "first" event or instance is not only different from a "second" or "third" instance, but also occurs at some point before the "second" and/or "third" instances. For example, the creation and sending of a baseline "full" copy of data (e.g., 145) could also be considered a second or third (or later) instance with respect to some prior event (not shown), even though described primarily as a first instance with respect to update 150. Similarly, update 150 could be described as a occurring at a "first" instance in time with respect to update 155 (e.g., a "second" instance), and so forth, though these terms are primarily described herein as "second" and "third" instances of times in the illustrated examples with respect to baseline full 145. Such term usage in the relative sense for sequential events also applies to usage herein of the terms "initial" or "subsequent."

For example, FIG. 2 shows that a method from the perspective of production server 105 of replicating production server data in a virtually continuous, application (i.e., or file system)-consistent fashion, such that recent data can be easily recovered from the backup server, comprises an act 200 of sending a consistent copy of volume data to a backup server. Act 200 includes sending a copy of volume data from a production server to a backup server, wherein the data are consistent for a first instance of time. For example, production server 105 (e.g., in response to replica agent or other command from backup server 110) creates an entire volume backup 145 that is consistent for a particular point in time (e.g., "$t_0$"). In one implementation, this involves calling all application writers at production server 105 to freeze and begin preparations for backup. Production server 105 then copies all data on the volume (or on specific files, folders, or file-types, etc.), and prepares this data to be sent to (and stored at) backup server 110.

Similarly, FIG. 2 shows that the method from the perspective of backup server 110 of replicating production server data in a virtually continuous, consistent fashion, such that recent data can be easily recovered from the backup server, comprises an act 240 of receiving an consistent volume backup from a production server. Act 240 includes receiving one or more volume backups from a production server, wherein the one or more volume backups are consistent (i.e., application or file system-consistent) for an initial instance of time. For example, FIG. 1A shows that backup server 110 receives and stores full backup 145, which is received over a network from production server 105, or received from a tape drive or other storage node that is at some point connected with backup server 110. In particular, a backup administrator can take a hardware snapshot of production server 105, and then attach the snapshot to backup server 110.

In addition, FIG. 2 shows that the method from the perspective of production server 105 comprises an act 210 of identifying one or more changes to the volume data. Act 210 includes identifying one or more changes to the volume data via one or more volume log files. For example, as shown in FIGS. 1A and 1B, volume filter driver 115 can track changes to files 120, 125, and 130 and store those changes in volume log file 135. In one implementation, these one or more changes may alternatively be stored in memory 170 as in-memory bitmaps before being placed in volume log file 135.

FIG. 2 also shows that the method from the perspective of production server 105 comprises an act 220 of saving one or more consistent updates to disk. Act 220 includes, upon identifying a replication cycle event, saving the one or more data changes in the one or more volume log files, wherein the one or more data changes are consistent for a second instance of time. For example, upon identifying a replication cycle trigger (e.g., from a replica agent), volume filter driver passes bitmaps 193, 195 in memory allocation 190a to allocated physical disk space 190b (e.g., also corresponding with volume log file 135). This physical disk allocation 190b thus comprises a snapshot for one point-in-time that is different from the snapshot 187 stored in disk allocation 185b (i.e., "all bitmaps" 187).

Furthermore, FIG. 2 shows that the method from the perspective of production server 105 comprises an act 230 of sending a copy of the consistent updates to the backup server during replication. Act 230 includes sending to the backup server a copy of the one or more data changes, such that the backup server has a copy of the data that are valid for a first instance of time and a second instance of time. For example, in addition to passing full update 145 to backup server 110, production server also sends consistent snapshot updates 150 and 155, which are each valid for different points in time (i.e., "$t_1$," "$t_2$," etc.).

Accordingly, FIG. 2 shows that the method from the perspective of backup server 110 comprises an act 250 of receiving one or more consistent updates. Act 250 includes receiving one or more consistent backup updates, at least one of which is a consistent update to at least one of the one or more volume backups for a subsequent instance of time. For example, backup server 110 receives any of consistent snapshot updates 150, 155, such that backup server now has data copies for various incremental points in time (i.e., "$t_1$," "$t_2$," etc.) compared to full backup 145 ("$t_0$," or some other baseline full).

In addition, FIG. 2 shows that the method from the perspective of backup server 110 comprises an act 260 of receiving a recovery request. Act 260 includes receiving a recovery request for data that are valid in accordance with the subsequent instance of time. For example, backup server 110 receives a request (not shown) for a particular file that is valid for time "$t_1$," which is a file found in both baseline full backup 145 and update 150. Furthermore, FIG. 2 shows that the method from the perspective of backup server 110 comprises an act 270 of identifying the requested data valid for the subsequent instance in time. Act 270 includes identifying the requested data for the subsequent instance of time at one or more backup server volumes, wherein the requested data include at least a portion of the at least one consistent backup update.

With respect to database data, for example, backup server 110 might roll together copies of the file at each preceding and current point in time that is valid for the request; that is, backup server 110 combines copies of the file from times "$t_0$," and "$t_1$." On the other hand with file system data, each subsequent update (e.g., 150, 155) may include a full, updated copy of the requested file, and, as such, backup server 110 may only need to identify the requested data in the most recent update (or some other subsequent update) for the requested point-in-time. Thus, depending on the type of data requested, backup server 110 may need to identify each incremental update from the point requested going back to the latest baseline full, or may need to simply identify the requested data in the latest point-in-time update.

As such, FIG. 2 also shows that the method from the perspective of backup server 110 comprises an act 280 of returning the requested data. Act 280 includes sending the requested data that is valid for the subsequent instance of time to the production server. For example, with the case of database data, backup server 110 provides recovery 160, which includes both baseline full data (e.g., 145) as well as incremental update data (e.g., 150, 155), while with file-system data, backup server 110 provides a recovery that has at least the file data from the requested update point-in-time. Backup server's 110 response 160 can also be an indication for which recovery time the response is valid. As shown in FIG. 1A, recovery data 160 shows that the data are valid for time "$t_1$."

Accordingly, the diagrams, components, and methods in accordance with implementations of the present invention provide a number of advantages over conventional backup systems. In particular, implementations of the present invention provide ways of backing up data that are data source agnostic (e.g., via volume filter driver 115), do not necessarily require a version of the application running on a backup server, and represent virtually continuous replication. As previously described, these optimizations are based at least in part on tracking or monitoring changes with low overhead at a volume level using a volume filter driver (e.g., 115), and also performing replication cycles at the file level using, for example, a USN journal, so that file-level inclusions/exclusions can still be applied.

In addition, implementations of the present invention provide for the creation of full baseline copies of the production server data at a backup server in an optimized manner, and without necessarily requiring transferring the full data across a network. Minimizing the amount of subsequent data that are transferred to a backup server can provide a substantial reduction in the potential resource drains on the network and on the production servers. As such, implementations of the present invention further provide a number of alternative ways for meeting stringent recovery time objectives. Implementations of the present invention also provide a number of ways for tracking data changes (e.g., byte or byte block level) with low performance overhead, and tracking data changes in a manner that is independent of the file system and hardware/software snapshots. Furthermore, implementations of the present invention also provide one or more ways to reconstruct path information (such as with USN-based replication) without necessarily requiring persistent state on the relevant production servers.

The embodiments of the present invention may comprise a special purpose or general-purpose computer including various computer hardware, as discussed in greater detail below. Embodiments within the scope of the present invention also include computer-readable media for carrying or having computer-executable instructions or data structures stored thereon. Such computer-readable media can be any available media that can be accessed by a general purpose or special purpose computer.

By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. At a production server in a computerized environment in which one or more production servers backup data to be protected on one or more volumes at one or more backup servers, a method of replicating production server data in a virtually continuous, consistent fashion, such that recent data can be easily recovered from the backup server, comprising the acts of:

at a first instance of time, creating a copy of data for one or more volumes from a production server, the copy corresponding to a full baseline of the data for the one or more volumes;

sending the copy of the data for the one or more volumes from the production server to a backup server, wherein the data is consistent for the first instance of time;

subsequent to the first instance of time, storing an indication for each of one or more changes to the data on the one or more volumes, the indications being stored in one or more bitmaps that are stored in volatile memory on the production server, wherein at least one of the one or more changes includes a change to a file path of a file corresponding to any of the one or more data changes at the production server, such that the file path at the production server is different from a path to the file at the backup server;

upon identifying a replication cycle event, saving the one or more bitmaps to one or more log files that are stored in persistent storage of the production server, wherein the one or more data changes are consistent for a second instance of time;

deleting the one or more bitmaps from the volatile memory;

using the indications from the one or more bitmaps to identify the one or more data changes for the one or more volumes;

correlating the paths for the file at the production server and at the backup server, such that new changes to the file can be sent to the backup server with a change in the path for the file, wherein correlating the paths comprises:

scanning a USN journal at least a first time to cache the change in file path at the production server;

scanning the USN journal at least a second time to identify the initial file path at the production server; and computing an adjusted path to the file at the backup server based on the first and second scans; and sending to the backup server a copy of the one or more data changes for the one or more volumes, such that the backup server has a copy of data for the one or more volumes that are valid for a first instance of time and a second instance of time.

2. The method as recited in claim 1, further comprising saving file-level data changes for the volume in one of a change filter, a change journal, or a USN journal.

3. The method as recited in claim 2, further comprising an act of correlating the one or more volume log files with one of the change filter, change journal, or USN journal to identify one or more changed files that correspond to the one or more data changes in each changed file.

4. The method as recited in claim 1, further comprising an act of marking the one or more data changes on any one of a byte level or a byte block level in the one or more volume log files.

5. The method as recited in claim 1, further comprising the acts of:

freezing the one or more in-memory bitmaps corresponding to the second instance in time; and creating a new set of one or more in-memory bitmaps corresponding to new writes to the one or more changed files for the third instance in time.

6. The method as recited in claim 1, wherein a volume filter driver receives the one or more data changes and applies the one or more data changes to the one or more volume log files.

7. The method as recited in claim 1, wherein the one or more data changes that are consistent for the first and second instances of time are at least one of application-consistent or file system-consistent.

8. The method as recited in claim 1, further comprising an act of sending a new update of volume data at the production server to the backup server, wherein the new update is consistent for a third instance of time, and wherein the time elapsed between the second and third instances of time is configurable for any time period of less than hour.

9. The method as recited in claim 8, further comprising an act of sending a request to the backup server for a copy of one or more files, wherein the request to the backup server for a copy of one or more files includes an indication that the one or more files are valid for one of the second or third instances in time.

10. The method as recited in claim 9, further comprising an act of receiving a recovery response from the backup server, wherein the recovery response includes a full copy of data for the requested one or more files as of the second or third instance of time.

11. The method as recited in claim 1, further comprising:
receiving the copy of data corresponding to the full baseline of the data for the one or more volumes, the copy of the data being consistent for the first instance of time;
receiving the copy of the one or more data changes for the one or more volumes, the copy of the one or more data changes being consistent for the second instance of time;
receiving a recovery request for data that is valid in accordance with the second instance of time;
identifying the requested data for the second instance of time at one or more backup server volumes, wherein the requested data includes at least a portion of the one or more data changes; and
sending the requested data that is valid for the second instance of time to the production server.

12. The method as recited in claim 11, further comprising the acts of:
receiving a subsequent copy of one or more data changes for the one or more volumes, the subsequent copy of the one or more data changes being consistent for a subsequent instance of time;
upon receiving a subsequent recovery request for data that is valid in accordance with the subsequent instance of time, identifying each of one or more copies of changes to the requested data that were received between receipt of the full baseline copy and receipt of the subsequent copy of one or more data changes; and
combining the full baseline copy of the requested data with the identified one or more copies of changes to the requested data.

13. The method as recited in claim 12, wherein the full baseline copy and the copies of the one or more data changes are at least one of application-consistent or file system-consistent.

14. At a production server in a computerized environment in which one or more production servers backup data to be protected at one or more backup servers, a computer storage media having computer-executable instructions stored thereon that, when executed, cause one or more processors at the production server to perform a method of replicating production server data in a virtually continuous, application-consistent fashion, such that recent data can be easily recovered from the backup server, comprising the acts of:
at a first instance of time, creating a copy of data for one or more volumes from a production server, the copy corresponding to a full baseline of the data for the one or more volumes;
sending the copy of the data for the one or more volumes from the production server to a backup server, wherein the data is consistent for the first instance of time;
subsequent to the first instance of time, storing an indication for each of one or more changes to the data on the one or more volumes, the indications being stored in one or more bitmaps that are stored in volatile memory on the production server, wherein at least one of the one or more changes includes a change to a file path of a file corresponding to any of the one or more data changes at the production server, such that the file path at the production server is different from a path to the file at the backup server;
upon identifying a replication cycle event, saving the one or more bitmaps to one or more log files that are stored in persistent storage of the production server, wherein the one or more data changes are consistent for a second instance of time;
deleting the one or more bitmaps from the volatile memory;
using the indications from the one or more bitmaps to identify the one or more data changes for the one or more volumes; and
correlating the paths for the file at the production server and at the backup server, such that new changes to the file can be sent to the backup server with a change in the path for the file, wherein correlating the paths comprises:
scanning a USN journal at least a first time to cache the change in file path at the production server;
scanning the USN journal at least a second time to identify the initial file path at the production server; and
computing an adjusted path to the file at the backup server based on the first and second scans; and
sending to the backup server a copy of the one or more data changes for the one or more volumes, such that the backup server has a copy of data for the one or more volumes that are valid for a first instance of time and a second instance of time.

* * * * *